H. C. SCHLICKER.
DRINK MIXING DEVICE.
APPLICATION FILED DEC. 29, 1919.
1,344,565.
Patented June 22, 1920.
2 SHEETS—SHEET 2.
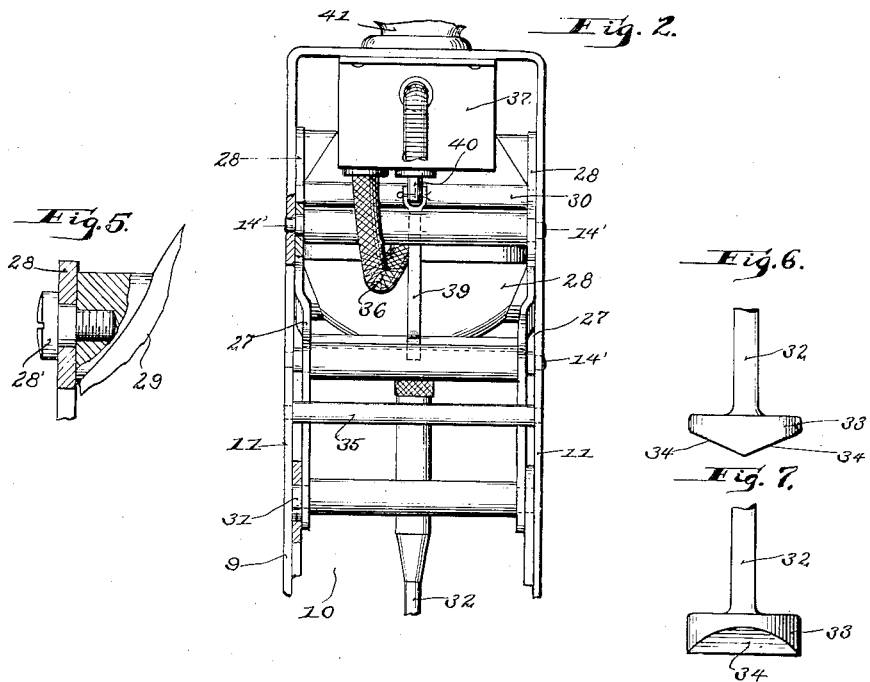
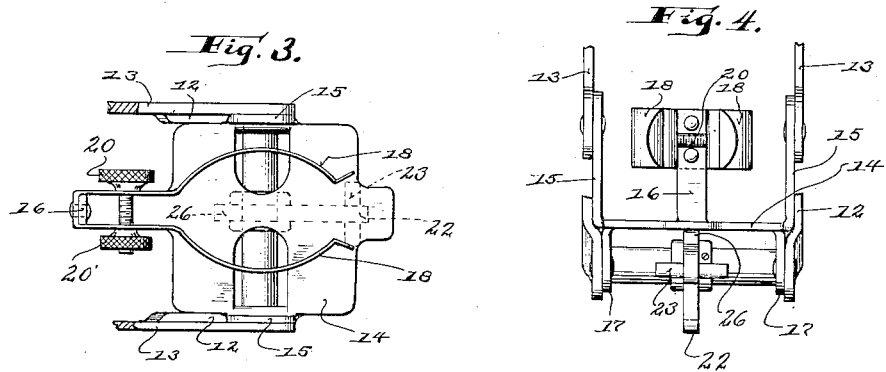
Inventor.
Herman C. Schlicker.
By Morsell & Keeney,
Attorneys.

H. C. SCHLICKER.
DRINK MIXING DEVICE.
APPLICATION FILED DEC. 29, 1919.

1,344,565.

Patented June 22, 1920.
2 SHEETS—SHEET 1.

UNITED STATES PATENT OFFICE.

HERMAN C. SCHLICKER, OF MILWAUKEE, WISCONSIN.

DRINK-MIXING DEVICE.

1,344,565.  Specification of Letters Patent.  Patented June 22, 1920.

Application filed December 29, 1919. Serial No. 347,938.

*To all whom it may concern:*

Be it known that I, HERMAN C. SCHLICKER, a citizen of the United States, and resident of Milwaukee, in the county of Milwaukee and State of Wisconsin, have invented new and useful Improvements in Drink-Mixing Devices, of which the following is a description, reference being had to the accompanying drawings, which are a part of this specification.

This invention relates to improvements in drink mixing devices.

It is one of the objects of the present invention to provide a drink mixing device which is more particularly adapted for agitating and stirring and mixing liquid beverages.

A further object of the invention is to provide a drink mixing device in which the glass containing the liquid to be mixed is moved upwardly to the mixing means while said mixing means is being moved downwardly toward the glass.

A further object of the invention is to provide a drink mixing device in which the current to the motor is automatically switched to the on position when the motor and the glass are moved into operative position, and the current is switched to off position when the parts are moved to their normal position of rest.

A further object of the invention is to provide a drink mixing device in which the weight of the motor will automatically hold the parts in operative position during the mixing operation.

A further object of the invention is to provide a drink mixing device which is also adapted to serve as an advertising device.

A further object of the invention is to provide a drink mixing device which is of simple construction, is strong and durable and is well adapted for the purpose described.

With the above and other objects in view the invention relates to the improved drink mixing device and its parts and combinations as set forth in the claims, and all equivalents thereof.

In the accompanying drawings in which the same reference characters indicate the same parts in all of the views:

Fig. 2 is a rear view of the upper portion of the drink mixing device;

Fig. 3 is a top detail view of the glass supporting portion of the device;

Fig. 4 is a front view of the same parts;

Fig. 5 is a detail view of one of the pivotal connections;

Fig. 6 is a detail view of the lower portion of the mixing portion of the device; and Fig. 7 is a similar view taken at right angles thereto.

Figure 1:
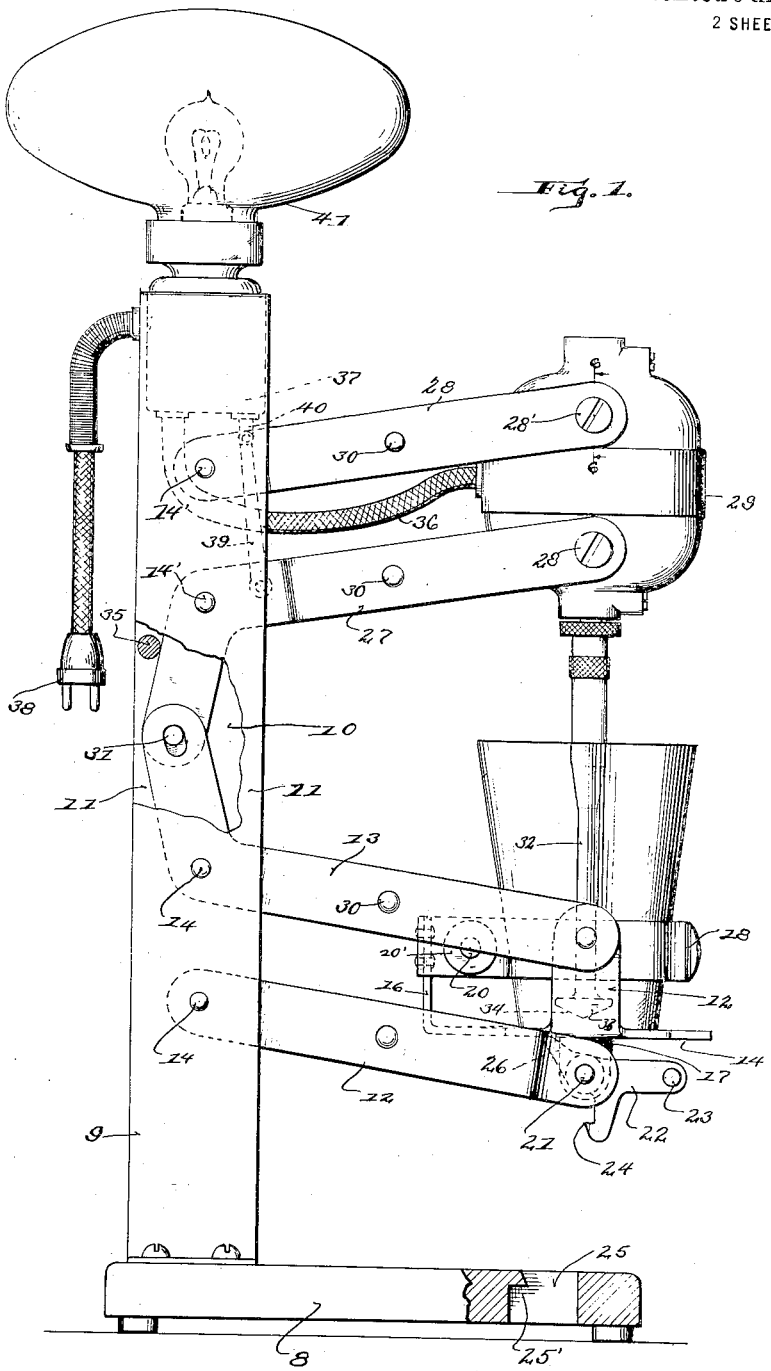
Figure 1 is a side view of the improved drink mixing machine, parts being broken away to show interior construction.

Referring to the drawings, the numeral 8 indicates the base or support which is provided with an inverted U-shaped standard 9 formed of flat metal to provide a space 10 between the legs 11 of the standard to mount the movable portions of the device.

Two pairs of parallel arms 12 and 13 are positioned between the legs 11 and are connected thereto by pivot pins 14. The arms 12 and 13 project forwardly from the legs and at their forward ends are pivotally connected to a glass support 14 which is formed of a piece of flat metal having upturned ears 15 and 16 and downturned ears 17. The arms 12 are pivotally connected to the downturned ears 17 which are cut from the body of the support and bent downwardly, and the arms 13 are pivotally connected to the ears 15 so that when swung from their pivotal connections with the legs 11, the support 14 will be maintained in a horizontal position in all positions of the arms.

The upturned ear 16 has connected thereto two forwardly extending spring arms 18 curved to yieldingly receive and hold a container or glass 19 therebetween. A thumb screw 20 extending through the spring arms 18 adjacent the ear 16 is provided with a nut 20' for adjusting the distance apart of said arms.

The pivot pin 21 extends from one arm 12 to the other and a gravity latch member 22 is fulcrumed on said pin between the ears 17. Said latch is of bell crank formation and is provided with a handle portion 23 and a hook portion 24 which is adapted to enter an opening 25 formed in the base 8 and automatically lockingly engage a shoulder 25′, forming part of the base portion, when the support is pushed downwardly. A stop finger 26 formed on the latch engages the under surface of the glass support and limits the position of the latch to freely enter the opening 25 and engages the locking shoulder 25′.

Above the two pairs of parallel arms 12 and 13 are positioned two pairs of other arms 27 and 28 which support the motor 29. The inner end portions of these arms also extend between the legs 9 and are pivoted thereto by pivot pins 14′. The arms extend forwardly from the legs and at their outer ends are pivotally connected to the electric motor 29 by screw pivots 28′ and will maintain the axis of said motor in a vertical line in all positions of the lever. All of the parallel levers are reinforced by shouldered cross pins 30.

The levers 13 and 27 are in the form of bell cranks with the inner ends of the levers 27 extending downwardly and the inner ends of the levers 13 extending upwardly and overlapping the downturned ends of the first mentioned levers. The overlapped ends are connected togethed by a pin and slot connection 31 so that when the latch is released from the base shoulder the weight of the motor will swing the levers 27 and 28 downwardly and the levers 12 and 13 upwardly to the position shown in Fig. 1. When in said position the axial line of the motor will be in vertical alinement with the center of the glass and the outer pivoted connections will be in vertical alinement. When the glass support is pushed downwardly to locked position to the base the motor will be automatically swung to its upper position and maintained in said position until the latch is again released.

The motor is provided with a downwardly extending spindle 32 having a lower mixing or agitating end portion 33 formed on its lower end which is adapted to mix the contents of the glass. The said lower end portion is of annular form in horizontal plane, with the lower parts angled downwardly and toward each other from opposite edges to form downwardly inclined faces 34, which agitate and mix the contents of the glass.

A stop pin 35 extending from one leg 11 to the other to the rear of the levers 27 limits the downward movement of the levers 27. Flexible circuit wires 36 for supplying current to the motor extend from the motor to a switch 37 mounted in the upper portion of standard 9 and from the switch the wires lead outwardly and are provided with a connector 38 for connection with a source of current supply.

A link 39 connected to the levers 27 and to the switch member 40 automatically switches the electric current on when the levers are in operative position, and to off position when the levers are in inoperative position so that in use it is only necessary for the operator to place the glass upon the support and release the latch and the parts will be moved into operative position and the motor will be operated. When the contents of the glass is mixed, the glass support is swung downwardly to its locked position and the current to the motor will be automatically switched to off position.

The upper portion of the standard is provided with an electric lamp and a globe 41 which may have advertising matter thereon if desired. The switch is also adapted to automatically turn on the current to the lamp when the mixer is in operation.

From the foregoing description, it will be seen that the drink mixing device is of very simple construction and may be easily kept in sanitary condition.

What I claim as my invention is:

1. A drink mixing device, comprising a standard, a motor carried by said standard and having a downwardly extending mixing stem, and a container support carried by said standard, said motor and support both being operatively connected to move toward each other to operative position.

2. A drink mixing device, comprising a standard, a motor carried by said standard and having a downwardly extending mixing stem, a container support carried by said standard, and means for moving the support upwardly to operative position when the motor is moved downwardly toward the support.

3. A drink mixing device, comprising a standard, arms pivoted to the standard and extending outwardly therefrom, a motor carried by some of the arms and having a mixing spindle, a container support carried by other of said arms, some of said arms being connected together to cause the support to be moved upwardly when the motor is moved downwardly toward the support, and means controlled by the movement of the arms for supplying electric current to the motor.

4. A drink mixing device, comprising a standard, pairs of parallel arms pivoted to the standard, a motor pivotally connected to some of the arms and having a downwardly extending mixing spindle, a container support pivotally connected to other of said arms, pairs of arms being connected together to swing the glass support upwardly when the motor is swung downwardly toward the support, and means controlled by the movement of the arms for supplying electric current to the motor.

5. A drink mixing device, comprising a standard, pairs of parallel arms pivoted to the standard, a motor pivotally connected to some of the arms and having a downwardly extending mixing spindle, a container support pivotally connected to other of said arms, pairs of the arms being of bell crank form and connected together to swing the glass support upwardly when the motor is swung downwardly toward the support, and means automatically controlled by the movement of the arms for supplying electric current to the motor.

6. A drink mixing device, comprising a base portion, a standard connected thereto and having spaced apart legs, a pair of arms pivoted to the legs and extending outwardly therefrom, a pair of bell crank arms pivoted to the legs and extending outwardly therefrom, a glass support pivoted to the outer end portions of said arms and maintained in vertical position thereby, a pair of bell crank arms pivoted to the legs above the first mentioned arms, a pair of arms pivoted to the legs above the last mentioned bell crank arms, a motor pivoted to the outer end portions of the last mentioned pairs of arms and maintained in vertical position thereby, said arms and support and motor forming parallelogram connections with the standard, the inner end portions of the lower pair of bell crank arms being connected to the inner end portions of the upper pair of bell crank arms to move the glass support upwardly when the motor moves downwardly, a yielding glass holding member carried by the support, a latch carried by the glass support and engaging the base portion when the parts are in operative position, and a stem carried by the motor and having a lower end mixing portion which enters the glass when the parts are in operative position.

7. A drink mixing device, comprising a base portion, a standard connected thereto and having spaced apart legs, a pair of arms pivoted to the legs and extending outwardly therefrom, a pair of bell crank arms pivoted to the legs and extending outwardly therefrom, a glass support pivoted to the outer end portions of said arms and maintained in vertical position thereby, a pair of bell crank arms pivoted to the legs above the last mentioned bell crank arms, a motor pivoted to the outer end portions of the last mentioned pairs of arms and maintained in vertical position thereby, said arms and support and motor forming parallelogram connections with the standard, the inner end portions of the lower pair of bell crank arms being connected to the inner end portions of the upper pair of bell crank arms to move the glass support upwardly when the motor moves downwardly, a yielding glass holding member carried by the support, a latch carried by the glass support and engaging the base portion when the parts are in inoperative position, a stem carried by the motor and having a lower end mixing portion which enters the glass when the parts are in operative position, and a switch carried by the standard and connected to one of the arms for automatically turning on the current to the motor when the parts are in operative position.

8. A drink mixing device, comprising a base portion, a standard connected thereto and having spaced apart legs, a pair of arms pivoted to the legs and extending outwardly therefrom, a glass support pivoted to the outer end portions of said arms and maintained in vertical position thereby, a pair of bell crank arms pivoted to the legs above the first mentioned arms, a pair of arms pivoted to the legs above the last mentioned bell crank arms, a motor pivoted to the outer end portions of the last mentioned pairs of arms and maintained in vertical position thereby, said arms and support and motor forming parallelogram connections with the standard, the inner end portions of the lower pair of bell crank arms being connected to the inner end portions of the upper pair of bell crank arms to move the glass support upwardly when the motor moves downwardly, a yielding glass holding member carried by the support, said base portion having a shoulder, a bell crank latch pivotally connected to the glass support and lockingly engaging the base shoulder when the parts are in inoperative position, a stem carried by the motor and having a lower end mixing portion which enters the glass when the parts are in operative position, and a switch carried by the standard and connected to one of the arms for automatically turning on the current to the motor when the parts are in operative position.

9. A mixing part for a drink mixing device, consisting of a depending stem having an enlargement on its lower end portion provided with beveled faces which incline downwardly and toward each other.

10. A mixing part for a drink mixing device, consisting of a depending stem having an annular enlargement on its lower end portion formed with lower beveled faces extending downwardly and toward each other from the outer peripheral edge.

11. A drink mixing device, comprising a standard, pairs of parallelogram arms pivoted thereto, a container support pivoted to some of said arms, a motor pivoted to other of said arms and having a mixing stem, pairs of said arms being connected together to cause the weight of the motor to swing the container support toward the motor, and automatic means controlling the operation of the motor.

12. A drink mixing device, comprising a standard, pairs of parallelogram arms pivoted thereto, a container support pivoted to some of said arms, a motor pivoted to other of said arms and having a mixing stem, pairs of said arms being connected together to cause the weight of the motor to swing the container support toward the motor, and means auomatically controlled by the swinging of the arms for operating the motor.

In testimony whereof I affix my signature.

HERMAN C. SCHLICKER.